United States Patent [19]
Bezzant et al.

[11] Patent Number: 6,014,717
[45] Date of Patent: Jan. 11, 2000

[54] PCMCIA HOST ADAPTER AND METHOD FOR VARIABLE DATA TRANSFERS

[75] Inventors: Daniel G. Bezzant, Fremont; Stephen A. Smith, Palo Alto; Narasimha R. Nookala, San Jose; Puducode S. Narayanan, Sunnyvale; Ashutosh S. Dikshit, Mountain View, all of Calif.

[73] Assignee: Cirrus Logic, Inc., Fremont, Calif.

[21] Appl. No.: 08/801,645

[22] Filed: Feb. 18, 1997

Related U.S. Application Data

[63] Continuation of application No. 08/307,965, Sep. 16, 1994, abandoned.

[51] Int. Cl.$^7$ .............................. G06F 13/16; G06F 13/36
[52] U.S. Cl. ................. 710/22; 710/23; 710/27; 710/28; 710/29; 710/31; 710/33; 710/34; 710/35; 710/37; 710/38; 710/62; 710/63; 710/126; 710/129; 710/130; 710/131
[58] Field of Search ..................................... 395/309, 311, 395/281, 842, 306, 882, 883, 884, 843, 848; 710/22–23, 27–28, 126, 129–131, 62–63, 33–35, 31, 29, 37–38

[56] References Cited

U.S. PATENT DOCUMENTS

| | | | |
|---|---|---|---|
| 4,641,261 | 2/1987 | Dwyer et al. .............................. | 710/63 |
| 5,237,660 | 8/1993 | Weber et al. ............................. | 395/250 |
| 5,241,630 | 8/1993 | Lattin, Jr. et al. ........................ | 39/325 |
| 5,335,326 | 8/1994 | Nguyen et al. .......................... | 395/250 |
| 5,426,739 | 6/1995 | Lin et al. ................................. | 395/309 |
| 5,426,740 | 6/1995 | Bennett .................................... | 395/325 |
| 5,450,551 | 9/1995 | Amim ...................................... | 395/299 |
| 5,455,915 | 10/1995 | Coke ....................................... | 395/293 |
| 5,471,590 | 11/1995 | Melo et al. .............................. | 395/288 |

OTHER PUBLICATIONS

M. Morris Mano, "Digital Logic and Computer Design", Microcomputer System Design, Prentice Hall, Inc. Englewood Cliffs, N.J., pp. 547–552, 1979.

J. D. Greenfield, "Practical Digital Design Using ICs", Computer Interfaces, Second Edition, John Wiley & Sons, pp. 546–553, 1977.

T. Shanley and D. Anderson, "ISA System Architecture", PC System Architecture Series, New revised edition, vol. 1, Chap. 19, Mind Share Press, pp. 367–395, 1993.

Data Sheet for PCI–To–PCMCIA Host Adapters CL–PD6730/PD6732, Circus logic Jan. 94 pp. 1–123.

*Primary Examiner*—John W. Cabeca
*Assistant Examiner*—Denise Tran
*Attorney, Agent, or Firm*—Jonathan O. Owens; Robert P. Bell; Frank D. Nguyen

[57] ABSTRACT

A PCMCIA host adapter includes the capability to master a non-DMA system bus and control a DMA data transfer between a DMA capable peripheral and the internal system memory. A peripheral can be coupled to the system through a PCMCIA card plugged into a PCMCIA expansion slot. A DMA controller coupled to the PCMCIA expansion slots through a PCMCIA bus controls a DMA transfer between the internal system memory and the peripheral. A bus master disables the CPU and takes control of the system bus during a DMA data transfer. In an alternative embodiment, the PCMCIA host adapter can be used with either a system having a system bus with DMA capability or with a system having a system bus without DMA capability. In this alternate embodiment if the system bus has DMA capability, the PCMCIA host adapter effectively passes the DMA signals between the peripheral and the system bus. If the system bus does not have DMA capability then the DMA controller and the bus master work to disable the CPU and take control of the system bus during a DMA data transfer. The DMA controller then controls the transfer of data between the peripheral and the internal system memory.

13 Claims, 7 Drawing Sheets

PCMCIA HOST ADAPTER AND METHOD FOR VARIABLE DATA TRANSFERS

This application is a continuation of application Ser. No. 08/307,965, filed on Sep. 16, 1994, now abandoned.

FIELD OF THE INVENTION

The present invention relates to the field of performing DMA transfers between a computer and peripheral devices which are connected to that computer through PCMCIA cards. More particularly, the present invention relates to the field of performing DMA transfers between a computer and peripheral devices where the system bus within the computer does not have DMA capability.

BACKGROUND OF THE INVENTION

DMA Data Transfer

During a computer's operation it is often necessary for data to be transferred between an external mass storage device, such as a magnetic disk or a magnetic tape, and the internal memory within the computer system. When these types of data transfers are performed by a microprocessor, latency and speed of these transfers are limited by the availability of the microprocessor within the computer and its speed. Using a direct memory access (DMA) technique, it is possible to bypass the microprocessor during such transfers and allow data to be transferred directly between the peripheral device and internal system memory, thus improving speed and reducing latency of the transfer, and correspondingly improving efficiency of the system.

During a DMA transfer, the microprocessor gives up control of the system bus and a DMA controller takes control of the system bus to manage the transfer directly between the peripheral device and the internal system memory. The microprocessor is then free to continue other calculations and operations while the DMA transfer is taking place as long as those other calculations and operations do not require the system bus.

Using a DMA technique, the transfer of data can be made for an entire block of memory words in a single stream of data or the transfer can be made by cycle stealing or transferring one word at a time in between microprocessor instruction executions. During cycle stealing, the microprocessor will delay its operation for one memory cycle to allow the direct memory transfer controller to steal one memory cycle. The microprocessor will then continue its operation and will allow the DMA data transfer to take place, on the system busses, between the execution of the microprocessor's instructions.

The DMA controller is an interface between the microprocessor, the peripherals and the internal system memory and therefore requires circuits necessary for communication with the microprocessor. In addition, the DMA controller includes an address register, a byte count register, a control register and a set of address lines. The address register and the address lines are used for direct communication with the internal system memory. The byte count register specifies the number of bytes remaining to be transferred by the DMA controller. The control register specifies the direction of the data transfer and other user selectable DMA transfer options. The data transfer is usually done directly between the specific peripheral device and the internal system memory, utilizing the data bus, under the supervision of the DMA controller.

A bus request signal line and a bus granted signal line are coupled between the microprocessor and the DMA controller. The bus request signal line, sometimes referred to as a hold command, is used by the DMA controller to request that the microprocessor disable its busses and allow the DMA controller to utilize them. The bus granted signal line, sometimes referred to as a hold acknowledge, is used to notify the DMA controller that the microprocessor has given up control of the system busses.

When it is necessary to transfer data from a peripheral device to the internal system memory the bus request signal line is raised by the DMA controller to a logical high voltage level. The microprocessor then completes the execution of the present instruction and places its busses, including the read and write signal lines, into a high-impedance state and then raises the bus granted line to a logical high voltage level. As soon as the bus granted, or hold acknowledge signal signal line is raised to a logical high voltage level, the DMA controller can take control of the system bus to communicate directly with the internal system memory. As long as the bus granted signal line is at a logical high voltage level the microprocessor does not have control of the system busses. To signal that the transfer of data is complete, the DMA controller will lower the bus request signal line to a logical low voltage level. The microprocessor will return to its normal operation after the bus request signal line is lowered to a logical low voltage level by lowering the bus granted signal line to a logical low voltage level and enabling its busses. The DMA controller also communicates with an external peripheral device through DMA request and DMA acknowledge signal lines in order to initiate a DMA transfer of data.

As stated above, the DMA controller includes an address register, a byte count register and a control register. The address register is used to specify the desired location of the data transfer within the internal system memory. The address register is incremented after each DMA byte transfer. The byte count register stores the number of bytes remaining to be transferred to or from the internal system memory. This register is decremented after each DMA byte transfer and is internally tested for zero. Once the byte count is equal to zero, the DMA controller lowers the bus request signal line to a logical low voltage level, signalling that the transfer of data is complete. Alternatively, the byte count register can store the number of bytes that have already been transferred. The byte count register will then be initialized to zero and incremented after each DMA byte transfer. In this case, the byte count register is internally compared against the number of total bytes of data to be transferred. The control register specifies the direction of the data transfer, whether it is into (write) or out of (read) the internal system memory. The microprocessor can read from or write into the three registers within the DMA controller.

A data transfer using DMA is first initialized by the microprocessor. The initialization is essentially a program consisting of instructions that include loading the three registers within the DMA controller with the specific information regarding the DMA transfer. During initialization, the address register is loaded with the address within the internal system memory where the transfer is to take place, the byte count register is loaded with the number of bytes to be transferred, the control register is loaded with the information regarding the direction of the data transfer.

After this initialization, a peripheral device can also initiate a DMA transfer by sending the DMA controller a DMA request signal. When the DMA controller receives a DMA request signal from a peripheral device, it activates its bus request signal line, informing the microprocessor that the DMA controller wishes to transfer data. As explained above the microprocessor then completes the execution of the present instruction and places its busses, including the read and write lines, into a high-impedance state. Once the DMA controller has control of the bus system it then places the current value of its address register onto the address bus, initiates the read or write signal and sends a DMA acknowledge signal to the peripheral device. The peripheral device then puts a byte of data on the data bus for a write operation or receives a byte of data from the data bus for a read operation. Thus, the DMA controller controls the read or write operation and supplies the address for the internal system memory. The peripheral device can then communicate with the internal system memory through the data bus for direct transfer between the two units while the microprocessor is disabled.

For each byte of data that is transferred, the DMA controller increments its address register and decrements its byte count register. If the value stored in the byte count register is not at zero, the DMA controller checks the request line from the peripheral. For a high-speed peripheral, the request line is activated as soon as the previous transfer is completed, a second transfer is then initiated and the process continues until the entire block of data is transferred. If the speed of the peripheral is slower, the request signal from the peripheral may come somewhat later. In this case, the DMA controller removes its bus request and allows the microprocessor to continue to execute its program. When the peripheral catches up and requests a transfer, the DMA controller will request the busses from the microprocessor again.

When the byte count register reaches zero, the DMA controller stops any further transfer of data and removes its bus request. The DMA controller indicates to the requesting peripheral the completion of the DMA transfer. The requesting peripheral may then generate an interrupt request to the microprocessor. When the microprocessor responds to the peripheral interrupt, it reads the contents of the byte count register. The zero value of this register indicates that all of the bytes of data were successfully transferred. The microprocessor can read the value stored in the byte count register at any other time as well, in order to check the number of bytes of data that have already been transferred.

SYSTEM BUSSES

System busses are used to allow circuits within a computer system to communicate with other circuits, such as between peripherals connected to the system and the internal system memory, as described above. A system bus consists of multiple signal lines, including address lines, data lines, Read/Write or handshake lines and other control signal lines. The size of a system bus is dependent on the capabilities of the CPU which is used to control the system bus.

Computer manufacturers have typically designed the internal computer system bus structure around the microprocessor that they support. Because each manufacturer supports its own microprocessor, numerous bus structures have been developed and become standards. IBM developed and uses the ISA bus standard for the IBM PC system bus structure, Apple Computer has developed and uses the NUBUS standard for the system bus architecture of some Macintosh computers, Intel has developed and uses the PCI bus standard and VESA (Video Electronics Standard Association) has developed and uses the Local Bus standard (VL Bus). There are many other bus structures used within various electronic equipment, but most of these system busses have not become popular standards because either the equipment is not used widely or the system bus is proprietary and is not disclosed. Not all of these bus structures have the capability to support DMA data transfer.

Of interest herein are the computer system busses developed around X86 family of microprocessors, including the ISA bus and the PCI bus and other processors built around the PCI bus. However, it will become clear that the present invention can be applied to other bus structures as well.

The ISA bus standard is used in almost every IBM PC or PC clone and accordingly has become a very popular bus standard. The ISA bus standard was created by IBM and has a 16 bit wide data path and a 24 bit wide address bus. The ISA bus is asynchronous and commonly operated with system clock rates of 8 MHz. Because the ISA bus standard has remained fixed, it has become limited for use in conjunction with modern high speed microprocessors. However, the ISA bus does have the capability to support DMA data transfers.

The PCI bus standard is a high-performance computer bus that was co-sponsored by Intel Corporation. The PCI bus standard has power saving features as well as a faster bandwidth rate than the ISA bus standard. The PCI bus standard also utilizes a 32 bit wide data/address bus. However, the PCI bus does not have the capability to support DMA data transfers.

The Personal Computer Memory Card International Association (PCMCIA) is an association which sets standards and specifications by which a peripheral communicates to a host adapter or CPU through an interface. A PCMCIA card is used as this standard interface and allows peripheral devices including a modem card, a network card, a sound card, a floppy disk drive and a hard disk drive to be coupled to the system computer through a PCMCIA card. This PCMCIA card is plugged into a PCMCIA expansion slot which is coupled to a PCMCIA adapter within the computer system. The PCMCIA standard enables memory and I/O devices to be inserted as exchangeable peripherals into personal computers.

Figure 1A:
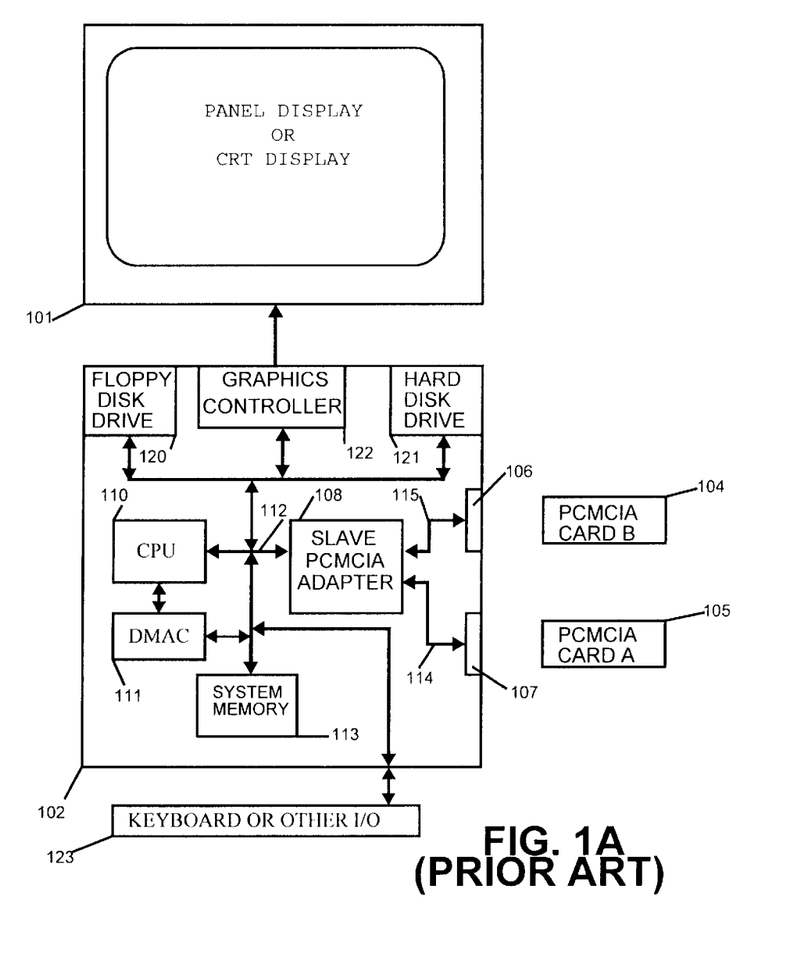
FIG. 1A illustrates a block diagram of a prior art system which has PCMCIA capability.

A block diagram of a computer system which has PCMCIA capability is illustrated in FIG. 1A. A motherboard 102 is coupled to a CPU 110, a PCMCIA host adapter 108, a DMA controller 111, an internal system memory 113, a floppy disk drive 120, a hard disk drive 121 and a graphics controller 122. The system busses 112 couple all of the above listed circuits to the CPU 110. The graphics controller 122 is also coupled to the display 101 and the system busses 112 are also coupled to a keyboard or other I/O device 123. The CPU 110 enables the DMA controller 111 to control the system busses 112 for a DMA transfer between a peripheral and the internal system memory 113. The PCMCIA host adapter 108 is also coupled to the two PCMCIA expansion slots 106, 107 by the PCMCIA bus signal lines 114. As peripherals are added to the system, a PCMCIA card 104 or 105 is plugged into one of the PCMCIA expansion slots 106, 107. When a DMA transfer is requested from a peripheral coupled to the PCMCIA host adapter 108, the PCMCIA adapter 108 requests the DMA controller 111 to initialize and execute the DMA transfer.

Figure 1B:
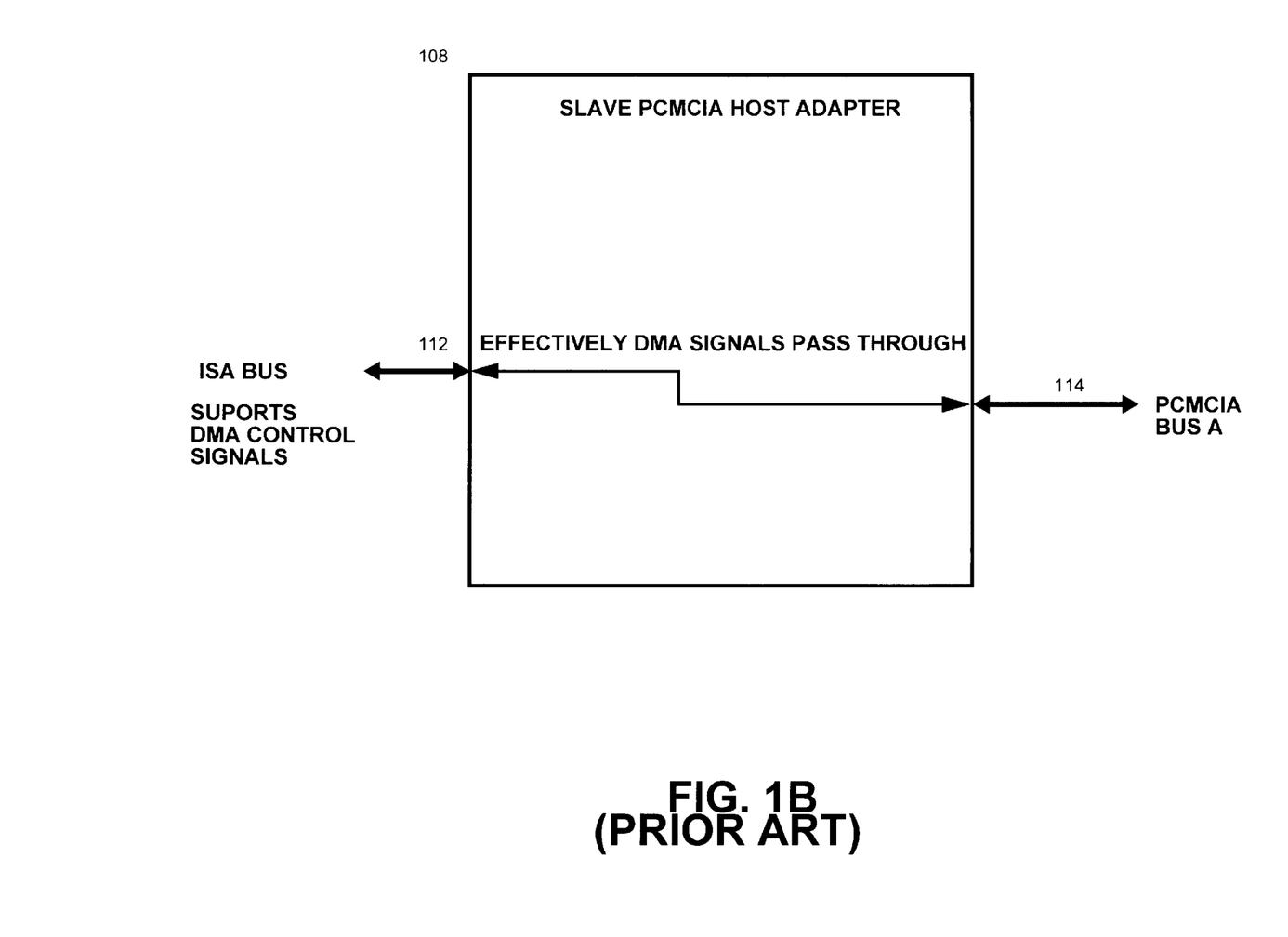
FIG. 1B illustrates a PCMCIA Host Adapter according to the prior art which effectively passes through DMA transfer signals.

At the present time, DMA capability is not required by the PCMCIA specification and standards. However, there are peripherals which can be connected to the system computer through the PCMCIA expansion slots 106, 107 and can be operated using a DMA transfer protocol. There are also system busses, such as the ISA bus, which also support DMA transfers. When a DMA transfer is to take place between a PCMCIA peripheral which has DMA capability and a system using a system bus also having DMA capability, the PCMCIA host adapters 108 of the prior art will effectively pass through the necessary DMA signals from the system bus 112 to the PCMCIA bus 114 as illustrated in FIG. 1B.

One of the PCMCIA cards 104 is coupled to a peripheral which does not have DMA capability. The other PCMCIA card 105 is coupled to a peripheral which does have DMA capability. When a PCMCIA card 104 or 105 is plugged into the PCMCIA expansion slot, the PCMCIA host adapter 108 first interrogates the PCMCIA card 104 or 105 to determine whether or not it has DMA capability. As long as that card remains plugged into the expansion slot 106, the PCMCIA host adapter 108 will know that it does or does not have DMA capability.

What is needed is a PCMCIA Host Adapter which can be coupled to a system bus which does not support DMA transfers and will take over the system bus during data transfers between the system memory and the peripherals plugged into the PCMCIA slots and effectively control a DMA data transfer between the peripheral and the system bus.

SUMMARY OF THE INVENTION

A PCMCIA host adapter includes the capability to master a non-DMA system bus and control a DMA data transfer between a DMA capable peripheral and the internal system memory. A peripheral can be coupled to the system through a PCMCIA card plugged into a PCMCIA expansion slot. The PCMCIA host adapter further includes a DMA controller coupled to the PCMCIA expansion slots through a PCMCIA bus to control a DMA transfer between the internal system memory and the peripheral. A bus master circuit coupled to the DMA controller disables the CPU and takes control of the system bus during a DMA data transfer. In an alternative embodiment, the PCMCIA host adapter can be used with either a system having a system bus with DMA capability or with a system having a system bus without DMA capability. In this alternate embodiment if the system bus has DMA capability, the PCMCIA host adapter effectively passes the DMA signals between the peripheral and the system bus. If the system bus does not have DMA capability then the DMA controller and the bus master work to disable the CPU and take control of the system bus during a DMA data transfer. The DMA controller then controls the transfer of data between the peripheral and the internal system memory.

DETAILED DESCRIPTION OF THE PREFERRED EMBODIMENT

Figure 2:
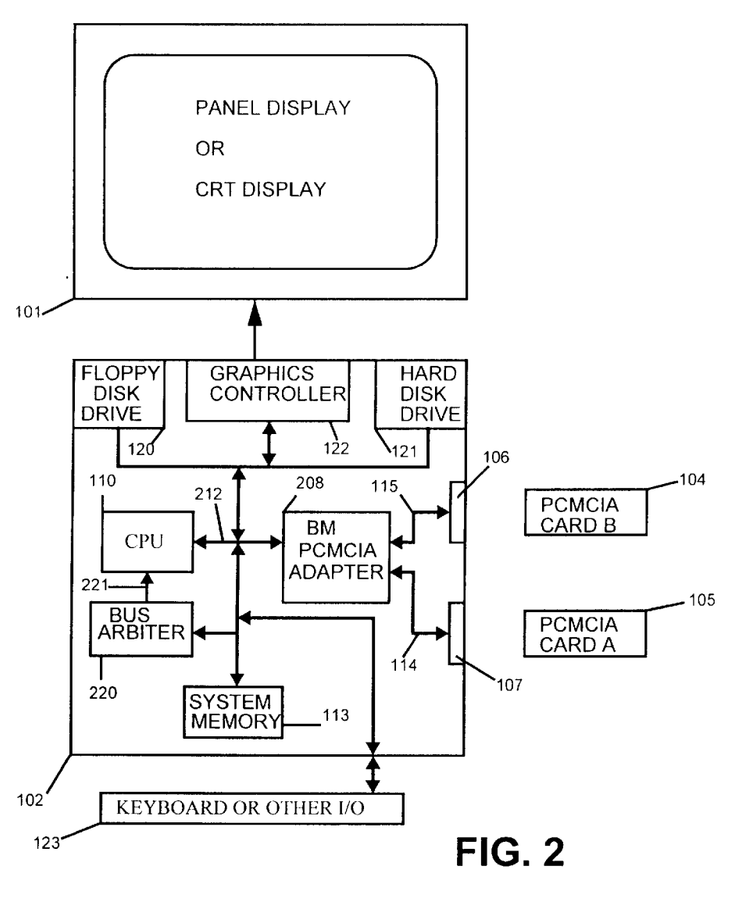
FIG. 2 illustrates a block diagram of a system according to the present invention incorporating a PCMCIA Host Adapter which includes a DMA controller.

A block diagram of a computer system according to the preferred embodiment of the present invention is illustrated in FIG. 2. This system includes a PCMCIA host adapter 208 having bus mastering capability, which is coupled to the CPU 110, to a bus arbiter 220 and to the system memory 113 by a system bus 212 which does not have DMA capability, such as the PCI bus. The PCMCIA host adapter 208 includes a DMA controller which allows DMA transfers to take place on the non-DMA system bus, between DMA capable peripherals coupled through the PCMCIA cards 104 and 105 and the internal system memory 113. The bus arbiter 220 determines which circuit within the system gets control of the system busses 212.

DMA transfer by mastering the system bus can be accommodated in the manner described above, however problems of latency are reintroduced by time required for bus arbiter 220 to signal the microprocessor to release the bus, the microprocessor to complete its current operations and release the bus, and the arbiter 220 to signal the PCMCIA adapter with DMA capability that it now may assume control of bus 212. Latency in transferring bus ownership back to the microprocessor 110 is also of concern. Both added latencies also directly affect system performance as they contribute to the time a microprocessor is idled for each transfer of bus ownership.

For reasons of minimizing impact of bus transfer latency performance penalties in a system, PCMCIA host adapter 208 uses on-chip FIFO buffering of DMA data to be transferred between PCMCIA cards 104, 105 and the system bus 212. In the case of a transfer from the system bus to the PCMCIA cards, the FIFO buffering capability assures that a burst of DMA data may occur with each mastering of the bus, independent of a PCMCIA card's speed of accepting such data. In the case of a transfer from PCMCIA card 104,105 to the system bus, buffering of DMA data assures that a bus does not become mastered for DMA transfers until there is a large amount of data ready to be burst to system memory. These measures (a) reduce the number of times mastering of a bus must change and (b) accommodate for variation in transfer speeds between the system bus 212 and PCMCIA cards 104,105. Both measures increase the availability of the system bus to the microprocessor.

Figure 3:
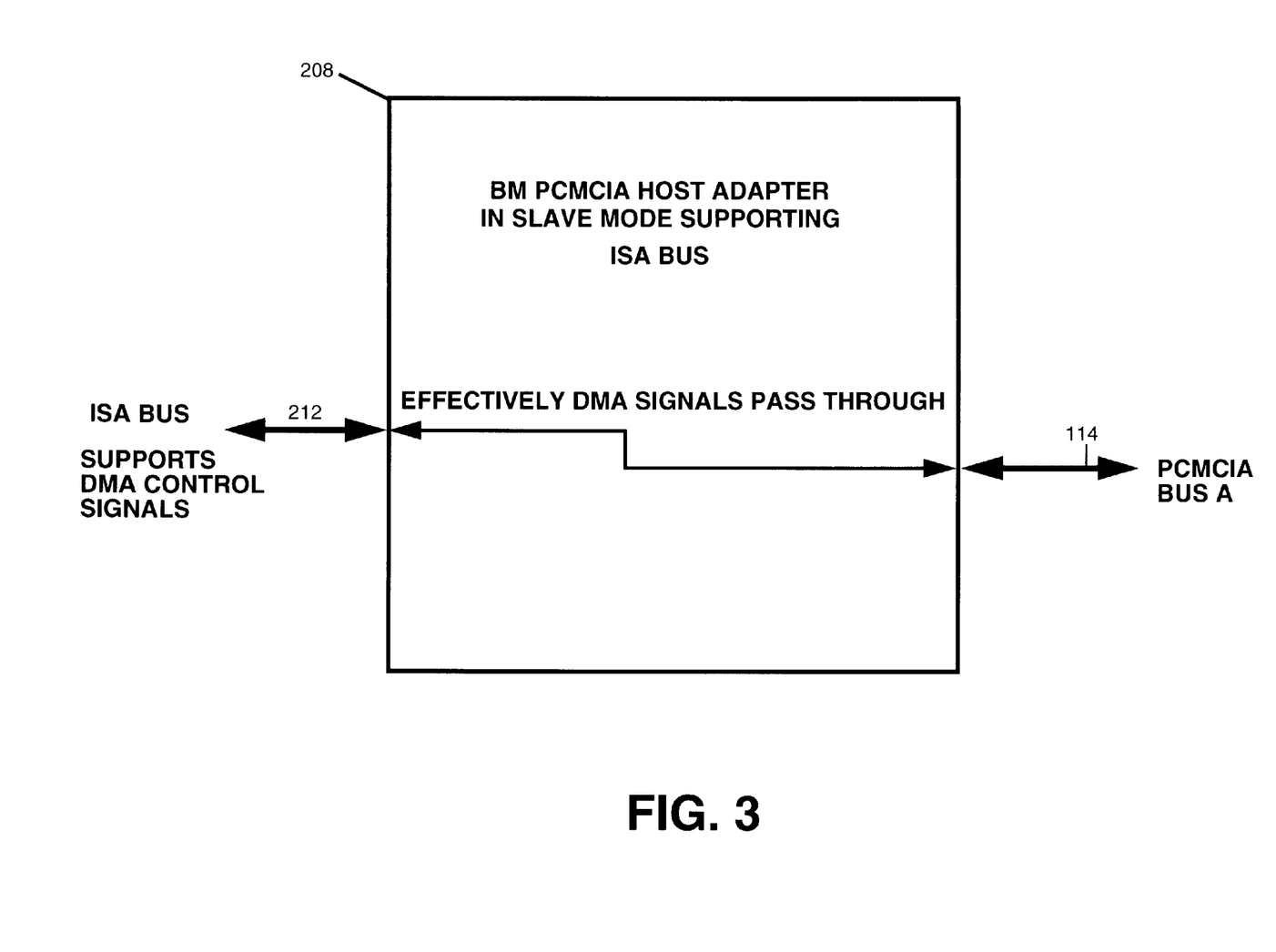
FIG. 3 illustrates a PCMCIA Host Adapter according to the present invention which is coupled to a DMA capable system bus and to a peripheral having DMA capability.

In an alternate embodiment of the present invention, a single PCMCIA host adapter 208 could be used with both system busses having DMA capability and system busses which do not have DMA capability. A control bit within this embodiment of the PCMCIA host adapter 208 can be used to specify whether or not the system bus 212 has DMA capability. If the system bus 112 does have DMA capability, then the control bit is set and the PCMCIA host adapter 208 will couple the system bus 212 to the PCMCIA bus 114 and effectively pass the DMA signals through the PCMCIA host adapter 208 as illustrated in FIG. 3. If the system bus 212 does not have DMA capability, then the control bit is reset and the PCMCIA host adapter 208 will couple the DMA signals to the DMA controller 404 which will then control any DMA transfers as discussed with reference to and illustrated in FIG. 4. This single PCMCIA host adapter 208 having dual bus compatibility could then be used in either a system having an ISA bus or a system having a PCI bus, for example.

Figure 4:
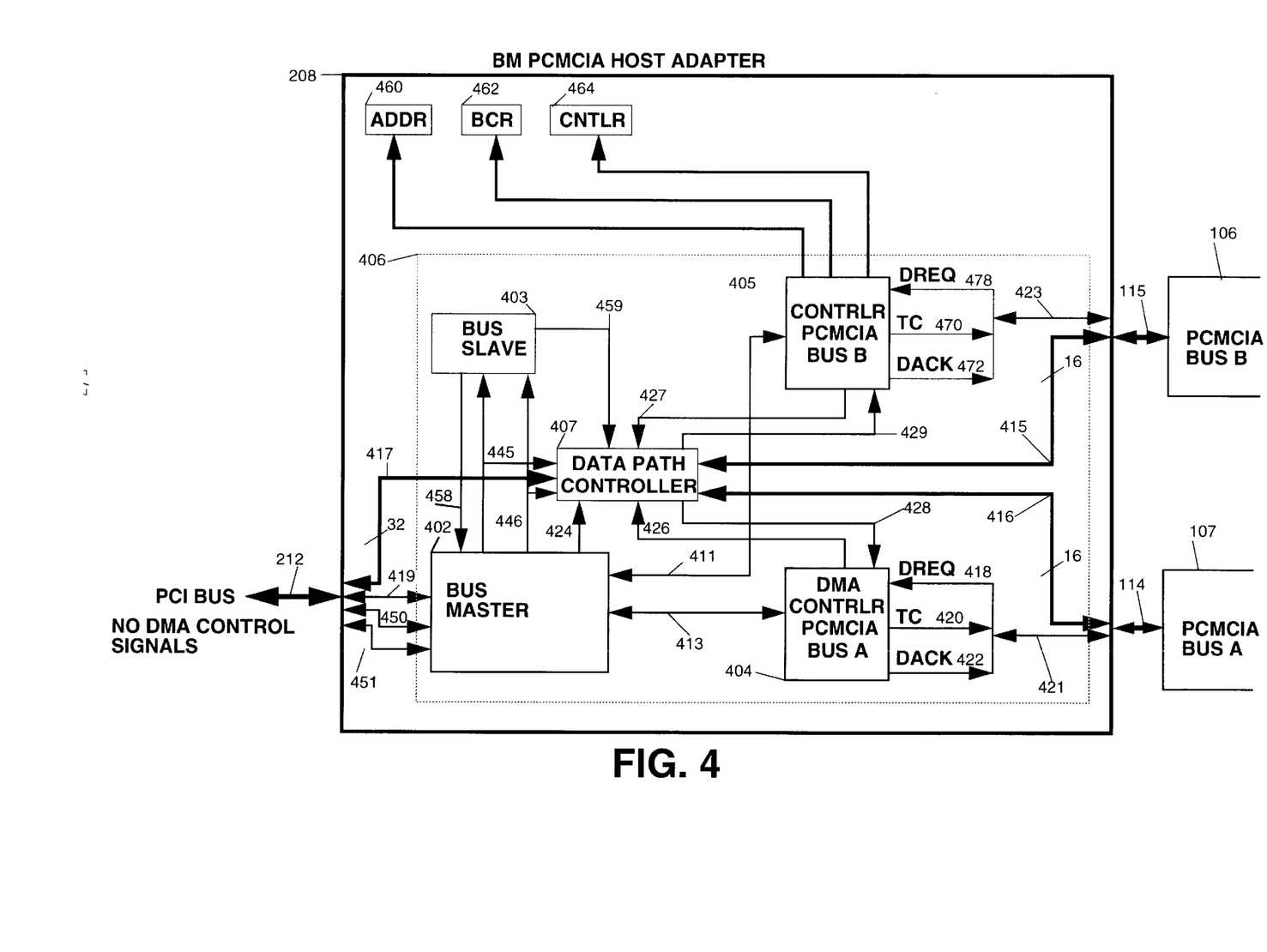
FIG. 4 illustrates a block diagram of a PCMCIA Host Adapter according to the present invention for controlling two PCMCIA expansion slots.

A block diagram of a PCMCIA Host Adapter 208 according to the preferred embodiment of the present invention is illustrated in FIG. 4. The PCMCIA Host Adapter 208 is coupled to a system bus 212 which does not support DMA data transfers and to the PCMCIA bus for slot A 114 and the PCMCIA bus for slot B 115. The PCMCIA host adapter 208 includes a DMA control engine 406 which controls the transfer of data to and from each of the PCMCIA expansion slots 106, 107 and internal registers including an address register 460, a byte count register 462 and a control register 464.

The DMA Controller 404 for controlling the DMA transfers across the PCMCIA bus A 114 is coupled to the PCMCIA bus 114 by a DMA request signal line 418, a DMA acknowledge signal line 422 and a terminal count signal line 420. The DMA controller 404 is also coupled to the bus master 402 by the signal lines 413 and to the data path controller 407 by the signal lines 426 and 428. The bus master 402 is also coupled to the system bus 212, to the data path controller 407 by the signal lines 424 and 446 and to the bus slave circuit 403 by the signal lines 446 and 458. The bus slave circuit 403 is also coupled to the data path controller 407 by the signal line 459.

The DMA controller 405 for controlling DMA transfers across the PCMCIA bus B 115 is coupled to the PCMCIA bus 115 by a DMA request signal line 478, a DMA acknowledge signal line 472 and a terminal count signal line 470. The DMA controller 405 is also coupled to the bus master 402 by the signal line 411 and to the data path controller 407 by the signal lines 427 and 429. The DMA controller 404 and the DMA controller 405 are designed to operate identically when data is being sent to or received from the peripheral coupled to their respective PCMCIA bus. Therefore, the operation of only the DMA controller 404 will be described in detail below.

The PCMCIA host adapter 208 includes an address register 460, a byte count register 462 and a control register 464 as described above. When the system is required to execute a data transfer, the address register 460 is loaded with the desired location of the data transfer within the internal system memory 113, the byte count register 462 is loaded with the number of bytes to be transferred and the control register 464 is loaded with the direction and mode of the data transfer, either into the internal system memory 113 or out of the internal system memory 113. After loading the respective values into the address register 460, the byte count register 462 and the control register 464, the DMA controller 404 signals to the bus master 402 that it should request control of the system bus 212. The bus master 402 then negotiates with the bus arbiter 220 for control of the system bus 212. The bus master 402 sends a request signal to the bus arbiter 220 over the bus request signal line 450. The bus arbiter 220 allows the CPU 110 to finish its current instruction before it allows the bus master 402 to take control of the system bus 212. The bus arbiter 220 then signals to the bus master 402 that it can now control the system bus 212, over the bus granted signal line 451. Once the bus master 402 has control of the system bus 212, the DMA controller 404 then controls the DMA transfer between the internal system memory 113 and the respective peripheral coupled through a PCMCIA card 104 or 105.

When the DMA data transfer is complete, the DMA controller 404 then notifies the bus master 402 that it no longer requires control of the system bus 212. The bus master 402 will then relinquish control of the system bus 212 to the bus arbiter 220 by taking away the signal on the request signal line 450. If for some reason, during the DMA transfer, the CPU must take back control of the system bus 212, the bus arbiter 220 will change the signal on the bus granted signal line 451, signalling to the bus master 402 that it no longer controls the system bus 212.

If the peripheral is slow or the DMA mode is set for the single transfer the bus master 402 will relinquish control of the bus 212 after a transfer burst. This allows the CPU to use the bus while data is being transferred into or out of the FIFO 606 to or from the slots 104 or 105.

The DMA controller 404, the bus master 402 and the bus slave circuit 403 work together with the data path controller to control the direction of data flow between the system bus 212 and the PCMCIA bus 114. The bus slave circuit 403 provides the interface to the system bus 212 when the CPU 110 or another circuit within the system has control of the system bus 212. The bus master 402 provides the interface to the system bus 212 when the PCMCIA host adapter 208 has control of the system bus 212 and is controlling a DMA data transfer. The data path controller 407 controls the direction of the data flow through the PCMCIA host adapter 208, either from the PCMCIA expansion slots 106, 107 to the system bus 212 or from the system bus 212 to the PCMCIA expansion slots 106, 107.

Figure 5:
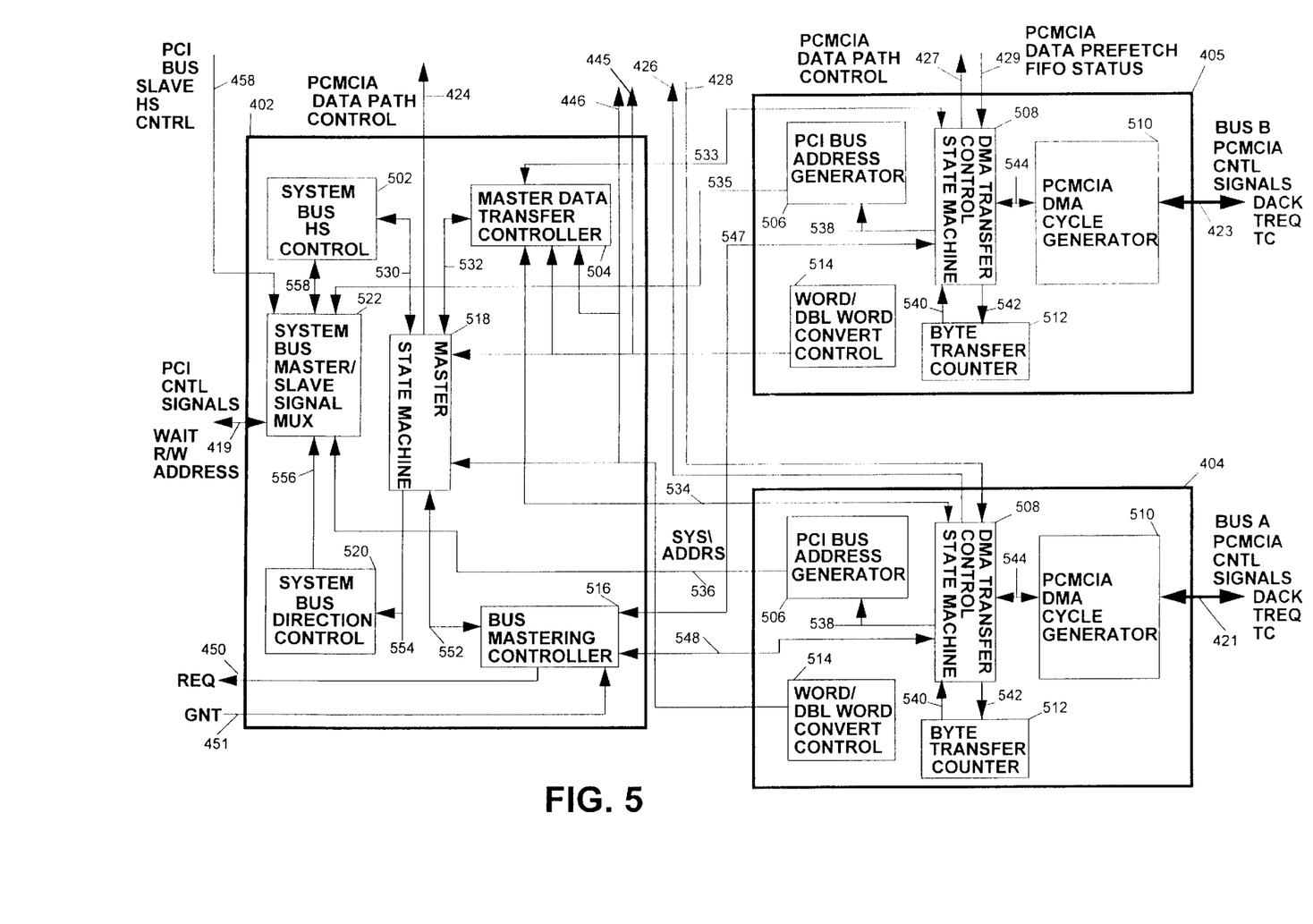
FIG. 5 illustrates a block diagram of a bus master logic circuit and a DMA controller logic circuit according to the present invention.

A more detailed block diagram of the bus master 402 and the DMA controllers 404 and 405 of the preferred embodiment is illustrated in FIG. 5. Within the bus master 402, the master state machine 518 is coupled to the system bus handshake control circuit 502 by the bi-directional signal line 530, to the master data transfer controller 504 by the bi-directional signal line 532, to the bus mastering controller 516 by the bi-directional signal line 552 and to the system bus direction control circuit 520 by the signal line 554. The system bus direction control circuit 520 is coupled to the system bus master/slave signal multiplexer 522 by the signal line 556. The system bus master/slave signal multiplexer 522 is also coupled to the system bus handshake control circuit 502 by the signal line 558.

The system bus master/slave signal multiplexer 522 is also coupled to receive the system bus control signals 419 including the wait signal, the read and write signals and the address signals from the system bus 212. The system bus master/slave signal multiplexer 522 is also coupled to the bus slave circuit 403 by the bus slave control signal line 458, which notifies the system bus master/slave signal multiplexer 522 that the bus slave circuit 403 is controlling the interface between the system bus 212 and the PCMCIA host adapter 208. The bus mastering controller 516 is also coupled to the bus arbiter 220 by the bus request signal line 450 and the bus granted signal line 451. The master state machine 518 is also coupled to the data path controller 407 by the data path control signal line 424.

Within the DMA controller 404, the DMA transfer control state machine 508 is coupled to the PCI bus address generator 506 by the signal line 538, to the PCMCIA DMA cycle generator 510 by the bi-directional bus 544 and to the byte transfer counter 512 by the signal lines 540 and 542. The DMA transfer control state machine 508 is also coupled to the data path controller 407 by the data path control signal line 426 and the data prefetch and FIFO status signal line 428, to the master data transfer controller 504 by the signal line 534 and to the bus mastering controller 516 by the signal line 548. The word/double word conversion control circuit 514 is also coupled to the master state machine 518, the master data transfer controller 504 and the data path controller 407 by the signal line 446. The system bus address generator 506 is also coupled to the system bus master/slave signal multiplexer 522 by the signal line 536. The PCMCIA DMA cycle generator 510 is also coupled to the PCMCIA control signal lines 421 for sending data to and receiving data from the peripheral plugged into the PCMCIA expansion slot A.

Within the DMA controller 405, the DMA transfer control state machine 508 is coupled to the PCI bus address generator 506 by the signal line 538, to the PCMCIA DMA cycle generator 510 by the bi-directional bus 544 and to the byte transfer counter 512 by the signal lines 540 and 542. The DMA transfer control state machine 508 is also coupled to the data path controller 407 by the data path control signal line 427 and the data prefetch and FIFO status signal line 429, to the master data transfer controller 504 by the bi-directional signal line 533 and to the bus mastering controller 516 by the bi-directional signal line 547. The word/double word conversion control circuit 514 is also coupled to the master state machine 518, the master data transfer controller 504 and the data path controller 407 by the signal line 445. The system bus address generator 506 is also coupled to the system bus master/slave signal multiplexer 522 by the signal line 535. The PCMCIA DMA cycle generator 510 is also coupled to the PCMCIA control signal lines 423 for sending data to and receiving data from the peripheral plugged into the PCMCIA expansion slot B.

Figure 6:
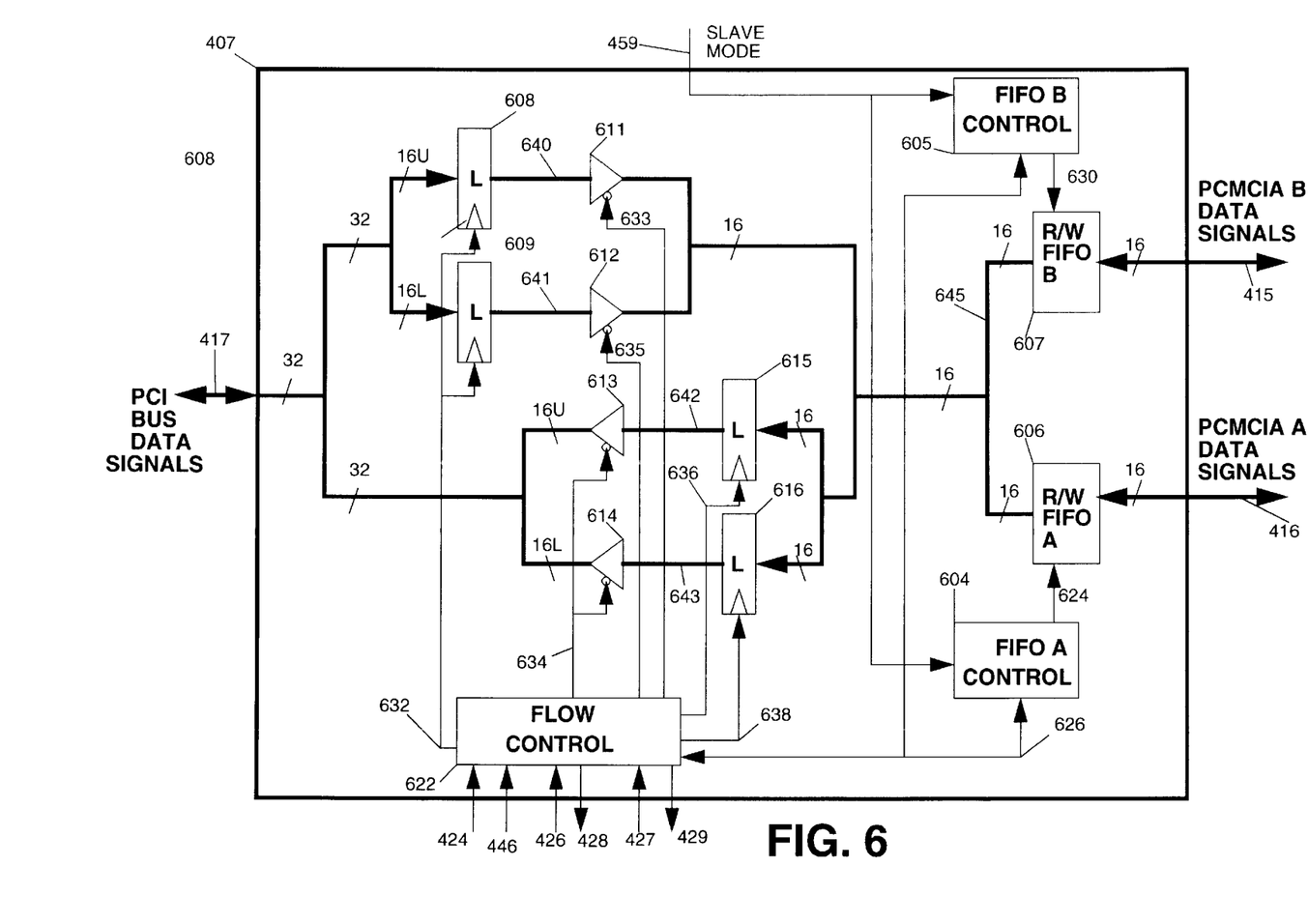
FIG. 6 illustrates a block diagram of a data path controller logic circuit according to the present invention.

A detailed block diagram of the data path controller 407 is illustrated in FIG. 6. The flow control circuit 622 controls the direction of the data flow between the system bus and the PCMCIA busses A and B. Because the PCI bus 417 is a thirty-two bit bus and the PCMCIA busses 415 and 416 are sixteen bit busses, the data path controller 407 must also pack two sixteen bit words from the PCMCIA bus 416 onto the PCI bus 417 or unpack a double word from the PCI bus 417 into two sixteen bit words and send them over the PCMCIA bus 416 one at a time, in the right order. The data path controller 407 also includes two sixteen bit read/write FIFOs 606 and 607 for prefetching data during a read or write instruction. The PCI bus 417 is coupled to the system bus 212. The PCMCIA bus A is coupled to the bus 114. The PCMCIA bus B is coupled to the bus 115.

The flow control circuit 622 is coupled to the master state machine 518 by the data path control signal line 424, to the word/double word conversion control circuit 514 by the signal line 446, to the DMA transfer control state machine 508 within the DMA controller 404 by the data path control signal line 426 and the data prefetch and FIFO status signal line 428 and to the DMA transfer control state machine 508 within the DMA controller 405 by the data path control signal line 427 and the data prefetch and FIFO status signal line 429. The flow control circuit 622 is also coupled to the FIFO control circuits 604 and 605 by the bi-directional signal line 626, to the data latch 616 by the control signal line 638, to the data latch 615 by the control signal line 636, to the data latches 608 and 609 by the control signal line 632, to the three-state buffer 611 by the control signal line 633, to the three-state buffer 612 by the control signal line 635 and to the three-state buffers 613 and 614 by the control signal line 634.

The PCMCIA sixteen bit bus and control signals 416 are coupled to the read/write FIFO 606. The PCMCIA sixteen bit bus and control signals 415 are coupled to the read/write FIFO 607. The FIFO control circuit 604 is coupled to the read/write FIFO 606 by the control signal line 624 and the FIFO control circuit 605 is coupled to the read/write FIFO 605 by the control signal line 630. The FIFO control circuits 604 and 605 are also coupled to the bus slave circuit 403 by the control signal line 459. The read/write FIFOs 606 and 607 are also coupled to the inputs of the latches 615 and 616 and to the outputs of the three-state buffers 611 and 612 by the sixteen bit bus 645. The output of the sixteen bit latch 615 is coupled to the input of the three-state buffer 613 by the bus 642. The output of the sixteen bit latch 616 is coupled to the input of the three-state buffer 614 by the bus 643.

The thirty-two bit PCI bus 417 is split into a sixteen bit upperword and a sixteen bit lower word. The sixteen bit upper word of the PCI bus 417 is coupled to the input of the latch 608 and to the output of the three-state buffer 613. The sixteen bit lower word of the PCI bus 417 is coupled to the input of the latch 609 and to the output of the three-state buffer 614. The output of the sixteen bit latch 608 is coupled to the input of the three-state buffer 611 by the bus 640. The output of the sixteen bit latch 609 is coupled to the input of the three-state buffer 612 by the bus 641.

When the PCMCIA host adapter 208 is not performing a DMA transfer and therefore does not have control of the system bus 212, the bus slave circuit 403 and the data path controller 407 work together to control the flow of data through the PCMCIA host adapter 208. When the PCMCIA host adapter 208 is performing a DMA transfer and therefore does have control of the system bus 212, the bus master 402 and all of its internal circuits, the respective one of the DMA controllers 404 or 405 and all of its internal circuits and the data path controller work to control the DMA transfer of data through the PCMCIA host adapter 208.

The peripheral device plugged into the PCMCIA expansion slot A 107 first sends a DMA request signal on the signal line DREQ 418 to the DMA controller 404. When the DMA controller 404 receives a DMA request signal from the peripheral device, it notifies the bus master 402 that it wishes to perform a DMA transfer and will need control of the system bus 212. The bus master 402 then sends a bus request signal on the bus request signal line 450 to the bus arbiter 220. The bus arbiter 220 then waits until the CPU 110 completes its present instruction, disables the CPU 110 and then notifies the bus master 402 on the bus granted signal line 451 that it can now have control of the system bus 212. Once the bus master 402 has control of the system bus 212, it then notifies the DMA controller 404 that it has control of the system bus 212. The DMA transfer is then initialized by loading the respective values in the address register 460, the byte count register 462 and the control register 464. In the preferred embodiment of the present invention the byte count register 462 is initialized to zero and compared against the total number of bytes to be transferred during the DMA transfer. The current value stored within the address register is then placed onto the address bus, and the DMA controller 404 then initiates the read or write signal and sends a DMA acknowledge signal to the peripheral device on the signal line DACK 422. The data path flow control circuit 622 is also notified from which direction the data transfer will be originating. If the data is to flow from the PCMCIA bus 416 to the PCI bus 417, the data flow control circuit 622 controls the data flow through the latches 615 and 616 and the three-state buffers 613 and 614, combining two sixteen bit words into a thirty-two bit double word. If the data is to flow from the PCI bus 417 to the PCMCIA bus 416, the data flow control circuit 622 controls the data flow through the latches 608 and 609 and the three-state buffers 611 and 612, separating the thirty-two bit double word into two sixteen bit words. The word/double word conversion control circuit 514 controls the packing or unpacking of the data between the thirty-two bit system bus 212 and the sixteen bit PCMCIA bus 114. The FIFOs 606 and 607 are used to manage the data flow through the data path controller 407.

The peripheral device will send data to or receive data from the FIFO 606. Thus, the DMA controller controls the read or write operation and supplies the address for the internal system memory 113. The peripheral device can then communicate with the internal system memory 113 through the system bus 212 and the PCMCIA bus 416 for direct transfer between the two units while the CPU 110 is disabled.

For each byte of data that is transferred, the DMA controller 404 increments the value stored in its address register 460 and the value stored in its byte count register 462. The DMA controller 404 monitors the value stored in the byte count register 462. When the value stored in the byte count register 462 is equal to the total number of bytes to be transferred, indicating that the DMA transfer is complete, the DMA controller 404 activates the terminal count signal line TC 420 signalling to the peripheral that the DMA transfer is complete. The terminal count signal line TC 420 is activated in the preferred embodiment of the present invention during the last card read or write cycle of the DMA transfer process.

If a peripheral device which does not have DMA capability is coupled to the system through a PCMCIA card 104 then the PCMCIA host adapter 208 according to the present invention will couple the system bus 212 to the PCMCIA bus 114, using the bus slave circuit 403 and the CPU 110 will control any data transfers which are required without using DMA. The PCMCIA host adapter 208 will then effectively pass the signals through the data path controller 407, in the direction of the transfer, controlled by the bus slave circuit 403.

While the system of the preferred embodiment has been designed to work with a PCI bus, the scope of the present invention should not be so limiting. It should be apparent to one skilled in the art that the principles of the present invention can be used with other system busses which do not support DMA transfer. It should also be apparent that the alternate embodiment of the present invention can also be used with system busses, other than the ISA bus, which do support DMA transfers. Other improvements and modifications which become apparent to persons of ordinary skill in the art only after reading this disclosure, the drawings and the appended claims are deemed within the spirit and scope of the present invention.

We claim:

1. An adapter circuit for interfacing between a peripheral and a computer system comprising at least a bus, a CPU coupled to the bus, and a memory coupled to the bus, the adapter circuit comprising:

a device for determining whether a direct transfer of data from said peripheral through said bus to said memory is achievable;

a first circuit coupled to said peripheral, said first said first circuit being adapted to transfer data directly from said peripheral to said memory through said bus, if said device for determining determines that a direct transfer through said bus is achievable based upon the DMA capabilities of said bus; and a second circuit coupled to said memory and to said CPU, said second circuit adapted for controlling the transfer of selected data to said memory if said device for determining determines that selected data can be transferred from a selected peripheral to said memory, said second circuit providing a second set of signals to said bus, if said device for determining determines that data cannot be transferred directly from said peripheral to said memory through said bus based upon the DMA capabilities of said bus.

2. The adapter circuit according to claim 1 further comprising an address register for storing a starting address indicative of a first memory location in the memory to store selected data.

3. An adapter circuit for interfacing between a peripheral and a computer system comprising a bus, a central processing unit (CPU) coupled to the bus, and a memory coupled to the bus, and a bus arbiter for controlling access to the bus, the adapter circuit comprising:

a DMA controller coupled to the peripheral, for receiving a first set of signals from the peripheral;

a device for determining whether the bus has direct memory address (DMA) capability;

a bus master circuit coupled to the bus arbiter, said bus master being effective for taking control of the bus if the bus does not have a DMA capability;

a controller coupable to the peripheral for buffering data from a peripheral; and an interface coupable to the memory, the controller and the CPU, said interface passing through the first set of signals if the device for determining determines that the bus has DMA capability, said interface providing a second set of signals to the bus if the device for determining determines that the bus does not have a DMA capability and said bus master circuit has control of the bus, the second set of signals controlling a transfer of data between the peripheral and the memory when said bus does not have a DMA capability.

4. A computer system for interfacing with a peripheral, the computer system comprising:

a CPU;

a bus coupled to said CPU;

a memory coupled to said bus;

a bus arbiter for controlling access to said bus;

an interface circuit coupled to said bus for interfacing with the peripheral, said interface circuit comprising:

a first interface coupled to the peripheral, said first interface receiving a first set of signals comprising a DMA transfer of a set of data from the peripheral to said memory;

a determination device for determining whether said bus has a DMA capability; and a second interface coupled to said memory and said CPU, said second interface passing through the first set of signals to said bus if said determination device indicates that said bus has a DMA capability, said second interface providing a second set of signals to said bus, if said determination device indicates that said bus does not have DMA capability, the second set of signals being effective for controlling the transfer of the set of data between the peripheral and said memory.

5. The computer system according to claim 4 wherein the first set of signals includes a set of ISA protocol signals and the second set of signals includes a set of PCI protocol signals.

6. The computer system according to claim 4 wherein the interface circuit further comprises a bus master coupled to said bus arbiter, said bus master taking control of said bus for transfer of the set of data if said bus does not support a DMA capability.

7. A method of performing a DMA transfer of a set of data between a peripheral device and a memory, the memory being coupled to a bus, the memory and the bus being comprised in a computer system, the method comprising:

receiving a first set of signals comprising a DMA transfer of data from a peripheral device;

transmitting a first set of signals to the bus, if the bus has a DMA capability; and providing a second set of signals to the bus, if the bus does not have a DMA capability, the second set of signals controlling the transfer of data between the peripheral and the memory.

8. The method according to claim 7 further comprising providing a means for determining whether a bus has a DMA capability, wherein said step of transmitting is performed if said means for determining indicates that the bus has a DMA capability.

9. The method according to claim 8 further comprising controlling the bus from a CPU for the transfer of the set of data, if the bus does not support a DMA capability.

10. A circuit for use in a computer system having a central processing unit (CPU), a memory, a bus and at least a single peripheral, the circuit comprising:

a determining circuit coupled to the CPU, the bus and the peripheral, for determining whether the bus has a direct memory address (DMA) capability;

a switching circuit coupled to the determining circuit, the bus and at least the peripheral, for coupling at least the peripheral to the bus and transmitting DMA signals if the bus has a DMA capability;

a controlling circuit coupled to at least the peripheral, the determining circuit and the memory, for accomplishing a DMA transfer if said determining circuit determines the bus does not have a DMA capability; and a mastering circuit coupled to the controlling circuit, the determining circuit, the bus, and the CPU for disabling the CPU, if the bus does not have a DMA capability.

11. A circuit for use in a computer system having a central processing unit (CPU), a memory, a bus and at least a single peripheral, the circuit comprising:

a circuit for determining whether the bus has a DMA capability;

a circuit for coupling a selected peripheral directly to the bus and effective for passing DMA signal, if the bus does have a DMA capability, the circuit for coupling being coupled to the circuit for determining;

a circuit for controlling a DMA transfer of data with the peripheral, said circuit for controlling being coupled to the circuit for determining and to the memory, for controlling a DMA transfer if the bus does not have a DMA capability; and a circuit for mastering the bus if the bus does not have a DMA capability, said circuit for mastering being coupled to the circuit for controlling, to the circuit for determining, to the bus and to the CPU, for disabling the CPU during a DMA transfer and for taking control of the bus if the bus does not have DMA capability.

12. A method comprising:

a. determining whether a selected bus has a DMA capability;

b. coupling at least a single peripheral to the selected bus and passing selected DMA signals if the selected bus does have a DMA capability;

c. mastering said selected bus if said selected bus does not have a DMA capability; and d. conducting a DMA transfer of data between at least a single peripheral and a selected memory.

13. A circuit for use in a computer system having a central processing unit (CPU), a memory, a bus, and at least a single PCMCIA slot, the circuit comprising:

a. a determining logic circuit coupled to the CPU, the bus and the at least a single PCMCIA slot for determining whether the bus has DMA capability;

b. a switching logic circuit coupled to the determining logic circuit, the PCMCIA slots and the bus for coupling the at least a single PCMCIA slot directly to the bus and effectively passing through DMA signals if the bus does have DMA capability;

c. a controlling circuit coupled to the PCMCIA slots, the determining logic circuit and to the memory for controlling a DMA transfer if the bus does not have DMA capability; and d. a bus mastering circuit coupled to the controlling circuit, the determining logic circuit, the bus and the CPU for disabling the CPU and mastering the bus if the bus does not have DMA capability.

* * * * *